United States Patent [19]
Sanford

[11] Patent Number: 6,146,442
[45] Date of Patent: Nov. 14, 2000

[54] APPARATUS AND METHOD FOR INTRODUCING GAS INTO A SHAFT FURNACE WITHOUT DISTURBING BURDEN FLOW

[75] Inventor: Daniel J. Sanford, Mooresville, N.C.

[73] Assignee: Midrex International B.V. Rotterdam, Zurich Branch, Switzerland

[21] Appl. No.: 09/227,928

[22] Filed: Jan. 8, 1999

[51] Int. Cl.⁷ .................................................... C21B 13/02
[52] U.S. Cl. ............................................ 75/490; 266/197
[58] Field of Search .............................. 75/488–498, 490; 266/197

[56] References Cited

U.S. PATENT DOCUMENTS 4,351,513 9/1982 Sanzenbacher ........................... 75/496

FOREIGN PATENT DOCUMENTS 641 128 1/1937 Germany .................................. 75/488

*Primary Examiner*—Melvyn Andrews
*Attorney, Agent, or Firm*—Dougherty & Clements LLP

[57] ABSTRACT

An apparatus for the direct reduction of iron oxide utilizing a shaft furnace equipped with a bustle and tuyere system having multiple rows of tuyeres. The bustle and tuyere system utilizes multiple rows of tuyeres to aid in the reduction of gas velocities through the system and to improve burden flow.

11 Claims, 2 Drawing Sheets

Current State Of The Art

APPARATUS AND METHOD FOR INTRODUCING GAS INTO A SHAFT FURNACE WITHOUT DISTURBING BURDEN FLOW

FIELD OF INVENTION

This invention relates to an apparatus for introducing gas into a packed bed shaft furnace without disturbing burden flow. More particularly, this invention relates to the introduction of reducing gas into a shaft furnace during the direct reduction of iron oxide.

BACKGROUND

All major steelmaking processes require the input of iron bearing materials as process feedstocks. If the steelmaking method uses a basic oxygen furnace, the iron bearing materials are usually blast furnace hot metal and steel scrap. To augment scrap supplies in times of high demand or to provide a more pure product, steelmakers seek and use alternative iron sources in addition to conventional hot metal and scrap. The most well known and broadly used alternative iron source is a product known as Direct Reduced Iron ("DRI") which is produced by the solid state reduction of iron ore without the formation of liquid iron.

Direct reduction of iron oxides captured steelmakers' imaginations several centuries ago when they first realized how easily oxygen could be removed from its iron ore carrier through reduction with hydrogen and/or carbon monoxide. However, harnessing the simple chemical reactions in large scale commercial production proved elusive. Then, in the early 1970's, the Midrex direct reduction process was developed. In the Midrex direct reduction process, reduction of iron ore oxides to iron is accomplished by forming a bed of iron containing burden, such as iron ore pellets, in a shaft furnace then injecting a reduction gas, typically a mixture of hydrogen and carbon monoxide, into the burden at temperatures less than 1000° C. The reduction gas is typically injected into the burden using a bustle and tuyere system.

In some facilities the throughput of direct reduction furnaces using the Midrex process has increased to such extent that the furnaces currently operate at twice their original capacity. In high capacity plants, where throughput of burden can reach 13–14 tons per cubic meter of furnace volume, the volume of gas necessary to operate the furnace has greatly increased over original designs and the velocity of gas leaving the tuyeres can reach 130 m/s. In conducting research into the operation of direct reduction furnaces operating under such conditions it was discovered that at elevated gas volumes and velocities, both mechanical and chemical problems are encountered.

High gas velocities can cause abrasion of the tuyeres. High gas volume velocity also tends to push the burden to the center of the furnace which disturbs the pressure distribution inside the furnace and creates a "funnel flow" or "slump" in the burden. Stated differently, high gas volumes and velocity creates a "bubble" in the descending burden at the tuyeres. The non-uniform flow of burden in the furnace allows reduction gas to escape unreacted by traveling up the sides of furnace. When unreacted gas escapes up the sides of the furnace, the center of the furnace tends to operate cooler than the perimeter thereby reducing the efficiency of the reduction process. Finally, non-uniform flow of burden results in unreduced or partially reduced burden leaving the reactor.

Simply put, the direct reduction of iron oxide has evolved beyond the limits of the equipment designed to carry out the direct reduction reaction. Therefore, a need exists for an improved system to inject reduction gas into a direct reduction furnace.

SUMMARY

The present invention is directed to an apparatus that satisfies the need for an improved reduction gas injection system. Current gas inlet systems used in direct reduction processes are bustle and tuyere systems that contain only one row of tuyeres in each bustle. In today's operating practice, a typical direct reduction furnace that utilizes the Midrex process has a bustle that contains 13 to 14 tuyeres per meter of furnace diameter. The velocity of gases through these tuyeres typically exceed 110 m/sec and can approach 130 m/sec. Through a series of lab tests, it has been found that using current bustle and tuyere designs gas velocities in excess of 70 m/sec with a pressure drop per meter of bed height of 170 millimeters of water column (mmWC) will "blow a bubble" in the burden at the tuyere.

The invented apparatus is part of a generally vertical shaft furnace having openings at the top and bottom to allow for the gravitational flow of iron oxide burden through the furnace. The apparatus comprises a gas inlet system located generally at the midpoint between the top and bottom of the furnace. The gas inlet system is a bustle and tuyere system that utilizes a single bustle with a plurality of tuyeres aligned in a plurality of rows. By adding another row of tuyeres to the bustle, the pressure and velocity of the gas through the tuyeres is substantially reduced, thereby eliminating the problems associated with introducing reduction gases into the furnace at high pressure and velocity. The rows of tuyeres may or may not be in vertical alignment and may be of varying distance from each other. The apparatus also comprises a gas outlet system that allows for the removal, collection and recycle of the reduction gas.

OBJECTS OF THE INVENTION

It is an object of the present invention to provide an improved apparatus for injecting reduction gas into a direct reduction furnace.

It is a further object of the present invention to provide a reduction gas injection system that will not create a funnel flow in the descending burden of a direct reduction shaft furnace.

It is a further object of the present invention to provide a reduction gas injection system that will help maintain a uniform temperature and pressure gradient within a direct reduction shaft furnace.

BRIEF DESCRIPTION OF THE DRAWINGS

The foregoing and other objects will become more readily apparent by referring to the following detailed description and the appended drawings in which.

DETAILED DESCRIPTION

Figure 1:
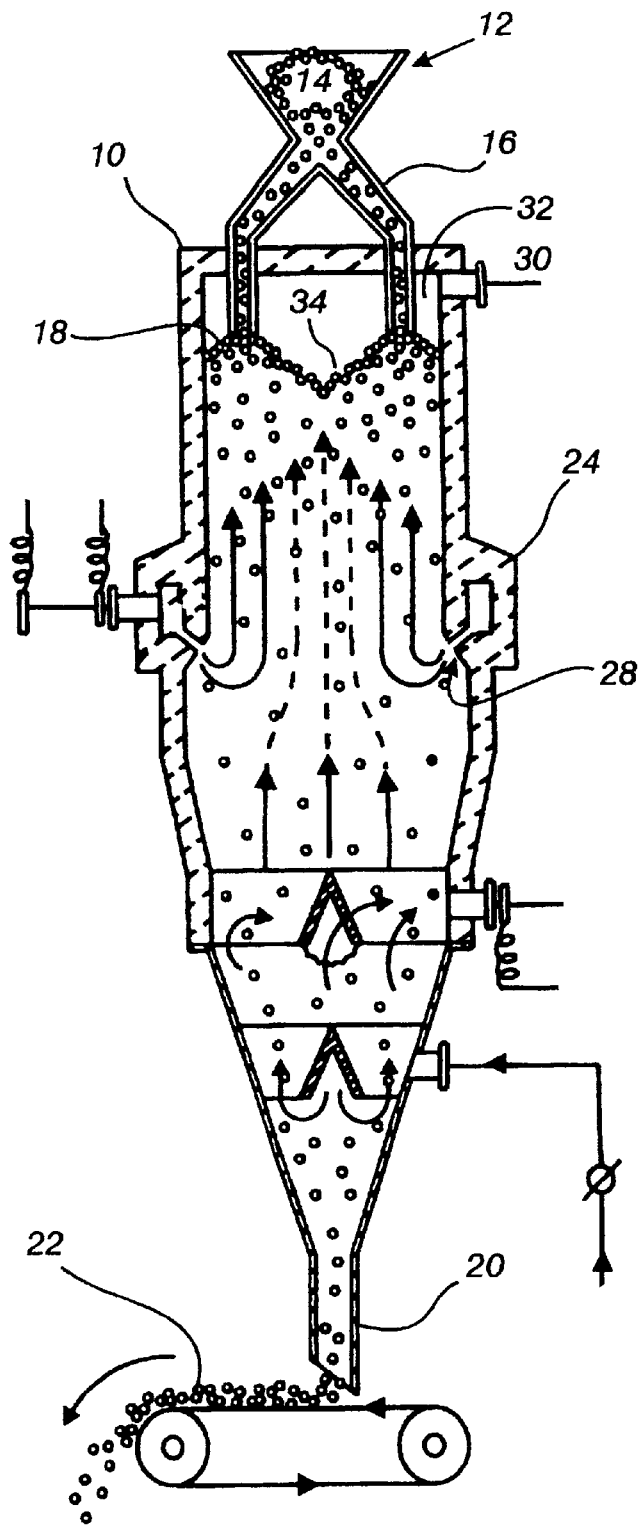
FIG. 1 is a schematic drawing of a vertical shaft furnace for the reduction of iron oxide that utilizes a single bustle and tuyere system.

The invented apparatus generally applies to the Midrex direct reduction apparatus disclosed in U.S. Pat. No. 4,046, 557, entitled "Method for Producing Metallic Iron Particles". The current state of the art pertaining to the apparatus for injecting reduction gas into a direct reduction furnace is shown in FIG. 1. Referring now to FIG. 1, a particle shaft furnace 10 has a feed hopper 12 mounted at the top thereof into which iron oxide pellets 14 or other materials such as lump ore are charged. The pellets descend by gravity through one or more feed pipes 16 to form a bed 18 of particulate iron oxide containing material, or burden, in the shaft furnace. The upper portion of the shaft furnace 10 comprises a reducing zone while the lower portion of the furnace comprises the cooling zone. A pellet discharge pipe 20 is located at the bottom of the shaft furnace 10. Reduced material is removed from the furnace by discharge conveyor 22 located beneath discharge pipe 20. Removal of the metallized pellets from discharge pipe 20 establishes gravitational flow of a particular iron oxide burden in shaft furnace 10.

At the upper portion of the shaft furnace 10 is a bustle and tuyere system, indicated generally at 24, having tuyeres 28 through which hot reducing gas is introduced to flow upwardly and in counterflow relationship to the movement of the burden 18. The spent top gas exists the furnace through gas takeoff pipe 30 at the top of the furnace.

In a typical shaft reduction furnace there are approximately 13 to 14 tuyeres per meter of furnace diameter through which reduction gas enters the burden. These tuyeres can range from 90 millimeters to 130 millimeters in diameter. Under normal plant operating conditions, gas velocities through the tuyeres can reach 130 meters per second. At these velocities the flow of burden and the reduction reaction can be significantly impaired. Essentially, the high velocity gas exiting the tuyere blows a "bubble" in the descending burden. This "bubble" forces falling burden to the center of the furnace causing the burden to "slump" or "funnel flow". Funnel flow causes the burden to move through the furnace faster than it should. Fast moving burden in the center of the furnace results in unreacted iron oxide being discharged from the bottom of the furnace and unreacted reducing gas flowing up the sides of the furnace.

Several experiments were conducted to document, first, the existence of the "bubble" in Midrex furnaces and, second, the best manner in which to eliminate the "bubble". The experiments were conducted in a scaled model of a Midrex direct reduction furnace. The model was fitted with several sight glasses to enable the operators to view the physical effect the reducing gas had on the burden as the burden proceeded through the furnace. Several test series were run in the model using a burden made up of DRI consisting of approximately 20% lump and 80% pellets. The bulk density for the burden was 1780 kg/m$^3$. For convenience air was used as the injection gas. Although air was used in the experiments, the data regarding gas flow rates presented herein has been converted to be reported as velocities and volumes of reducing gas.

A first test series was conducted to confirm the existence of gas bubbles in Midrex furnaces. A bustle and single tuyere configuration utilizing operating conditions found at various Midrex plants was observed. In each instance a gas bubble was documented in the descending burden at the tuyere. Based upon the model, a gas bubble is created when the gas flow through the bustle exceeds 1300 Nm$^3$/h with a gas velocity above 70 m/sec. To emphasize, based on results from the model, every Midrex plant operating at today's high capacities has a gas bubble around the perimeter of the bustle at the tuyeres.

Based upon this early data it was believed that bubble formation was based solely on aerodynamic pressures exerted on the burden by the bustle gas. In other words, it was originally thought that high gas injection velocity, such as 130 m/sec, was the sole cause of the bubbles. Therefore, several other bustle and tuyere configurations designed to reduce the injection velocity were tested.

One configuration that was tested incorporated one bustle with two rows of tuyeres approximately 200 mm apart. Utilizing a 2100 Nm$^3$/h gas flow through the bustle with a gas velocity of 57 m/sec out of both rows of tuyeres, a visible gas bubble was observed. A second test utilizing a 1240 Nm$^3$/h gas flow through the bustle with a gas velocity of 33 m/sec out of both rows of tuyeres was observed not to form a bubble. Unfortunately these gas injection rates from the second test are not sufficient to fully reduce the iron oxide that currently passes through most Midrex furnaces. Therefore, additional configurations were tested.

After additional experiments were conducted it was discovered that the condition primarily responsible for gas bubble formation was a high pressure drop in the first half meter of the furnace above the injection point. The effect of the high pressure drop is that it tends to fluidize the burden directly above the tuyere thereby increasing the void fraction significantly. As a result of the increased void fraction, the pellets are more free to move around. When acted upon by the aerodynamic forces of the injected gas, the pellets pack inward and upward (away from the issuing bustle gas) leaving a void (the gas bubble) just above the tuyere entry at the outer perimeter.

It is also suspected that the "packedness", or change in void fraction due to the bubble, may in part be responsible for a diminution of gas flow up through the very center of the furnace. If this is the case, the gas bubble may be responsible for a temperature dip that can be found in the center of some furnaces. One possible explanation is that the funnel flow caused by the bubble packs the burden toward the center of the furnace making the center more restrictive to gas flow. Not as much gas reaches the center of the furnace therefore the center of the furnace operates a few degrees cooler than the perimeter.

In the final configuration of the model it was possible to sustain very high gas flow rates without forming a gas bubble. A double row of bustle tuyeres was used to substantially reduce gas velocity and hence the aerodynamic forces available from the issuing bustle gas. It was discovered that by spacing the two rows of tuyeres approximately one meter apart, a zone was created in the burden capable of receiving all of the bustle gas with no significant pressure drop between the rows of tuyeres. This condition allowed injection rates of up to 3400 Nm$^3$/h bustle gas with 96 m/sec gas velocity without the formation of a gas bubble.

It is believed the one meter spacing eliminated bubble formation for the following reasons. The gas flowrate through the upper row of tuyeres is not enough by itself to create the high pressure drop required for bubble formation, also, the gas velocity is low. As for the bottom row of tuyeres, the gas prefers to flow toward the top of the furnace but upon attempting to do so it "sees" the high pressure entry region of the tuyere row above it and is forced to travel an alternate low resistance course. The distance between the tuyere rows then forces the gas from the lower tuyere row to seek less restrictive alternate flow lines. Upon doing this, the bustle gas injected through the lower row of tuyeres never joins forces with the bustle gas injected through the top row of tuyeres. The pressure drop previously taken over the first half meter of burden has now been effectively spread out over a distance of at least one and a half meters. This even distribution of pressure eliminates the gas bubble.

In the final analysis, it was determined that using a bustle and single tuyere system, the maximum gas flow rate that would not produce a gas bubble was approximately 70 m/sec, a sharp decline from the 130 m/sec that can be found in operating plants. By using a bustle and double tuyere system gas velocities approaching 96 m/sec may be utilized without forming a bubble in the burden, but with injection volume rate well over twice the single tuyere system.

Figure 2:
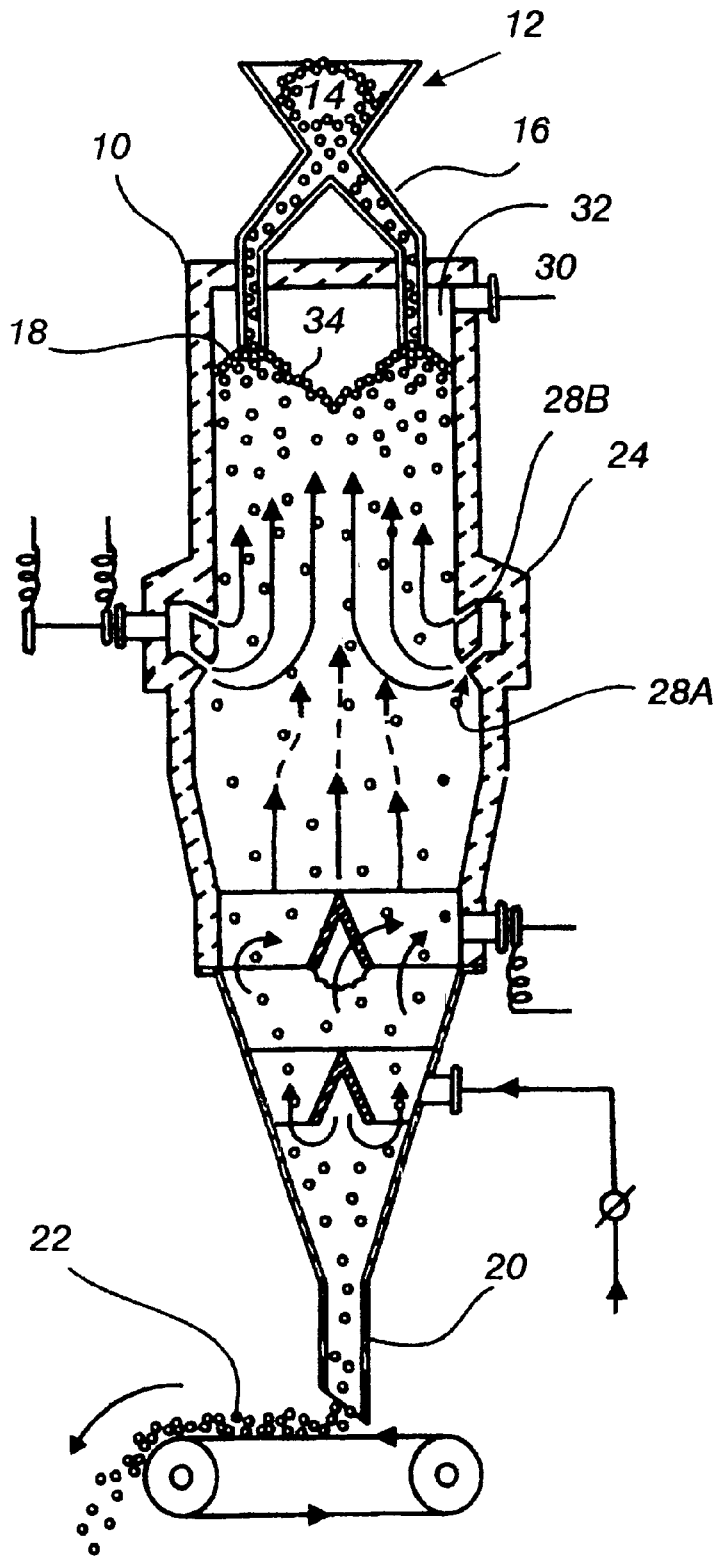
FIG. 2 is a schematic drawing of a vertical shaft furnace for the reduction of iron oxide that utilizes a single bustle and double tuyere system.

Referring now to FIG. 2 which is a schematic drawing of one embodiment of the apparatus of the invention, the particle shaft furnace 10 having a feed hopper 12 mounted at the top thereof into which iron oxide pellets 14 or other materials such as lump ore are charged. The pellets descend by gravity through one or more feed pipes 16 to form a bed 18 of particulate iron containing material, or burden, in the shaft furnace. The upper portion of the shaft furnace 10 comprises a reducing zone while the lower portion of the furnace comprises a cooling zone. A pellet discharge pipe 20 is located at the bottom of the shaft furnace 10. Reduced material is removed from the furnace by discharge conveyor 22 located beneath discharge pipe 20. Removal of the metallized pellets from discharge pipe 20 establishes gravitation flow of the particulate iron oxide burden in shaft furnace 10.

At the upper portion of the shaft furnace 10 is a bustle and tuyere system indicated generally at 24 having two rows of tuyeres 28A and 28B separated by a fixed distance, D, and through which hot reducing gas is introduced to flow upwardly and in counterflow relationship to the movement of the burden 18. Fixed distance D may be between about 1000 mm to about 2000 mm, depending upon the number of tuyeres 28, the size of the shaft furnace 10 and quantity and the type of reducing gas utilized.

The spent top gas exits the furnace through gas takeoff pipe 30 at the top of the furnace. The lower end of the pellet feed pipe 16 extends below takeoff pipe 30, which arrangement creates a reacted gas disengaging plenum 32 which permits the gas to exit generally symmetrically from the pellet stock line 34 and flow freely to the takeoff pipe 30.

SUMMARY OF THE ACHIEVEMENT OF THE OBJECTS OF THE INVENTION

From the foregoing, it is readily apparent that I have invented an improved method and apparatus for injecting reduction gas into a direct reduction furnace; an improved reduction gas injection system that will not create a funnel flow in the descending burden of a direct reduction shaft furnace; and an improved reduction gas injection system that will help maintain a uniform temperature and pressure gradient within a direct reduction shaft furnace.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An apparatus for direct reduction of iron oxides to a metallized iron product, comprising:

(a) a generally vertical shaft furnace;

(b) a device to charge particulate iron oxide material to the upper portion of said furnace to form a burden therein, and a device to remove metallized iron product from the bottom of said furnace, whereby a continuous gravitational flow of said burden can be established through the furnace;

(c) a reducing gas inlet system comprising a single bustle having multiple sets of tuyeres communicating with said bustle said tuyeres being aligned in multiple vertically-spaced rows around the circumference of the furnace through which a common reducing gas is injected into the burden, said reducing gas inlet system located intermediate to the ends of the furnace and arranged integrally within the wall of the shaft furnace; and (d) a reacted gas outlet at the upper end of said furnace.

2. Apparatus according to claim 1 wherein the reducing gas inlet system is a bustle and tuyere system with multiple sets of tuyeres aligned in multiple linear rows around the circumference of the furnace.

3. Apparatus according to claim 2 wherein the multiple sets of tuyeres contain an equal number of tuyeres.

4. Apparatus according to claim 2 wherein the multiple sets of tuyeres do not contain an equal number of tuyeres.

5. Apparatus according to claim 3 wherein the individual tuyeres in each row are in vertical alignment.

6. Apparatus according to claim 4 wherein the individual tuyeres in each row are not in vertical alignment.

7. Apparatus according to claim 1 wherein the reducing gas inlet system is a bustle and double tuyere system with a first set of tuyeres and a second set of tuyeres, said first and second sets of tuyeres containing an equal number of tuyeres and said first and second sets of tuyeres being aligned in two linear rows around the circumference of the furnace.

8. Apparatus according to claim 1 wherein the tuyeres are not of uniform cross sectional area.

9. An apparatus according to claim 7 wherein the distance between first and second sets of tuyeres is between about 1000 mm and about 2000 mm.

10. A method for the direct reduction of iron oxides comprising the steps of:

charging particulate iron oxide material to a generally vertical shaft furnace to form a burden therein;

injecting a common reducing gas from a single bustle, through multiple sets of tuyeres and into said burden, said single bustle arranged integrally within the wall of the shaft furnace, said single bustle having multiple sets of tuyeres communicating with said bustle, said tuyeres being aligned in multiple vertically-spaced rows around the circumference of the furnace, and removing metallized iron product from the bottom of said furnace thereby establishing a continuous gravitational flow of said burden through said furnace.

11. A method according to claim 10 wherein said single bustle contains a first row of tuyeres and a second row of tuyeres, the distance between said first row of tuyeres and second row of tuyeres being between about 1000 mm and 2000 mm.

* * * * *